United States Patent
Ishii et al.

(10) Patent No.: US 8,184,514 B2
(45) Date of Patent: May 22, 2012

(54) SIGNAL QUALITY EVALUATING APPARATUS AND METHOD, AND INFORMATION RECORDING MEDIUM

(75) Inventors: Toshiki Ishii, Yokohama (JP); Kenichi Shimada, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 53 days.

(21) Appl. No.: 12/612,029

(22) Filed: Nov. 4, 2009

(65) Prior Publication Data

US 2010/0220570 A1    Sep. 2, 2010

(30) Foreign Application Priority Data

Feb. 27, 2009    (JP) ................................. 2009-045056

(51) Int. Cl.
*G11B 7/00*    (2006.01)

(52) U.S. Cl. ..................................... 369/53.31; 369/103

(58) Field of Classification Search ............... 369/47.53, 369/53.2, 53.22, 53.31, 53.35
See application file for complete search history.

(56) References Cited

U.S. PATENT DOCUMENTS

| | | | |
|---|---|---|---|
| 7,116,626 B1 * | 10/2006 | Woods et al. ................... | 369/103 |
| 7,508,744 B2 * | 3/2009 | Yamakage et al. ............ | 369/103 |
| 2005/0213470 A1 * | 9/2005 | Saito et al. ..................... | 369/103 |
| 2005/0286387 A1 * | 12/2005 | Ayres et al. .................... | 369/103 |
| 2005/0286388 A1 * | 12/2005 | Ayres et al. .................... | 369/103 |
| 2009/0207710 A1 * | 8/2009 | Ayres et al. .................. | 369/53.35 |
| 2009/0213718 A1 * | 8/2009 | Minabe et al. .......... | 369/112.24 |

FOREIGN PATENT DOCUMENTS

| JP | 2008-097688 | | 4/2008 |
|---|---|---|---|
| JP | 2008097688 A | * | 4/2008 |

OTHER PUBLICATIONS

Tsutomu Shimura, "Systems, Devices and Materials for the Holographic Data Storage," CMC Publishing Co., Ltd. 2006, pp. 125-205.

* cited by examiner

*Primary Examiner* — Wayne Young
*Assistant Examiner* — Brenda Bernardi
(74) *Attorney, Agent, or Firm* — Antonelli, Terry, Stout & Kraus, LLP.

(57) ABSTRACT

A signal quality evaluating method necessary for a signal quality evaluation index and a margin design is provided for an apparatus utilizing hologram recording techniques. An evaluation index is used being obtained by dividing root sum square of standard deviations of luminance value distribution of on- and off-pixels obtained from reproduced signals, by a difference between average values.

10 Claims, 10 Drawing Sheets

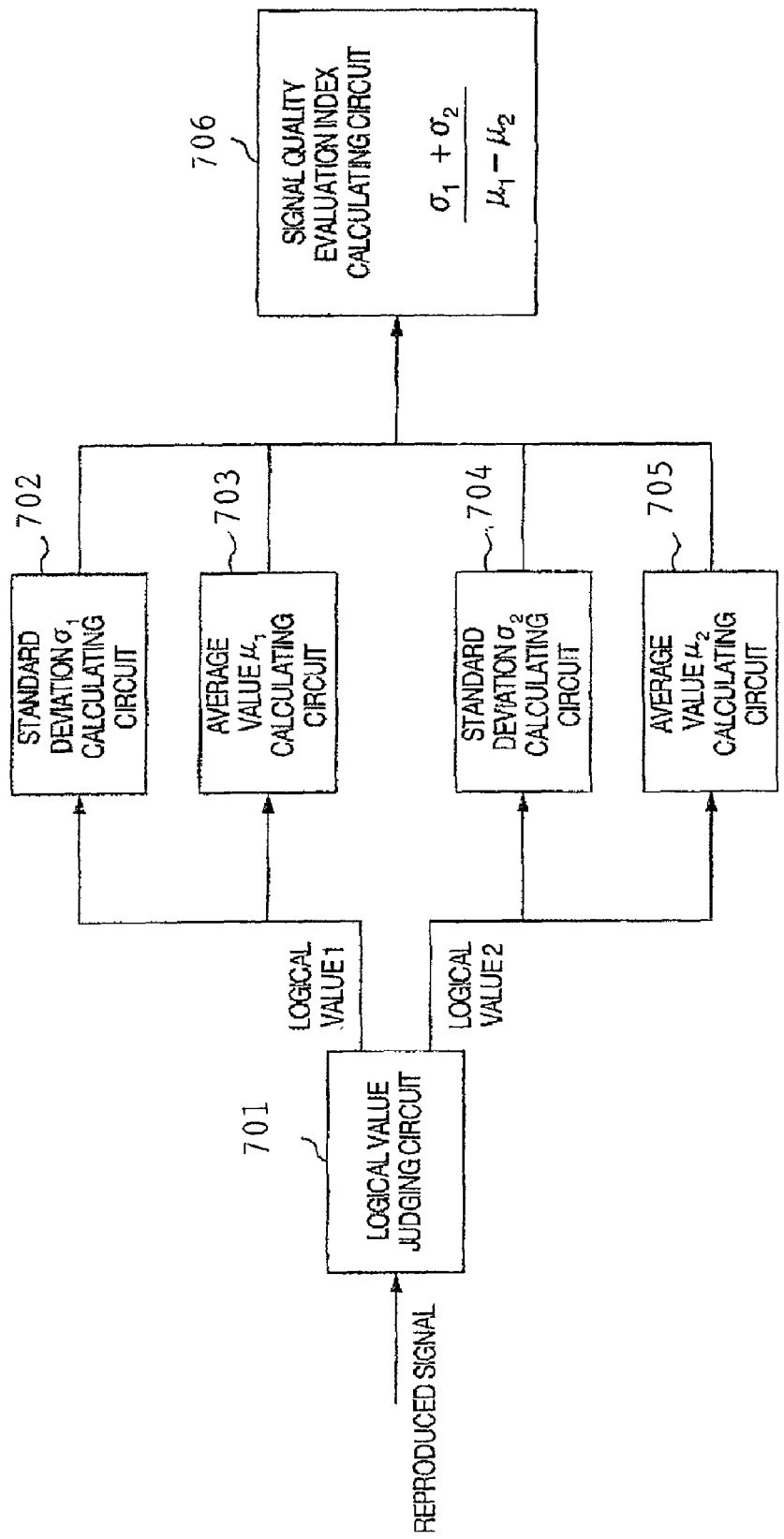

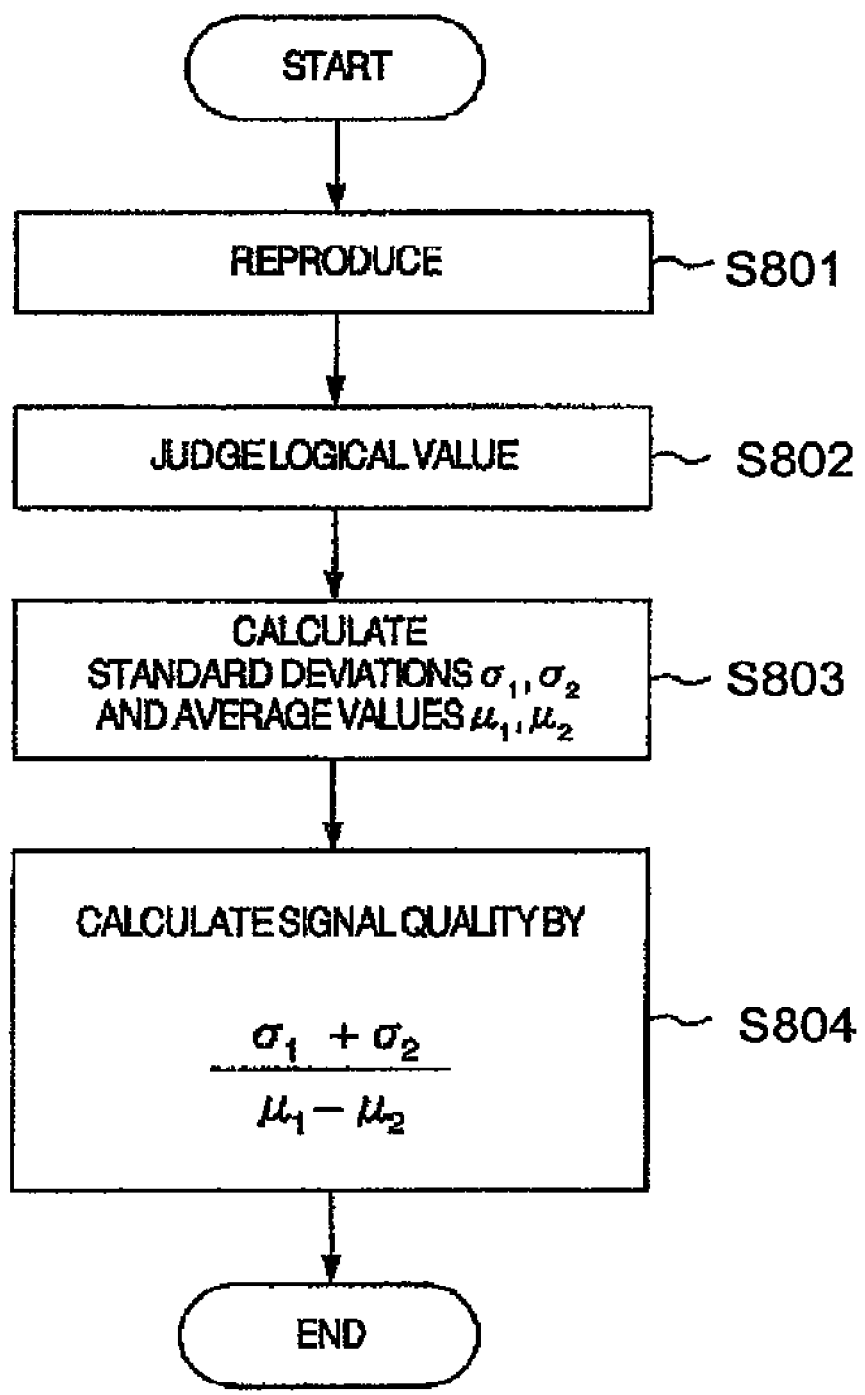

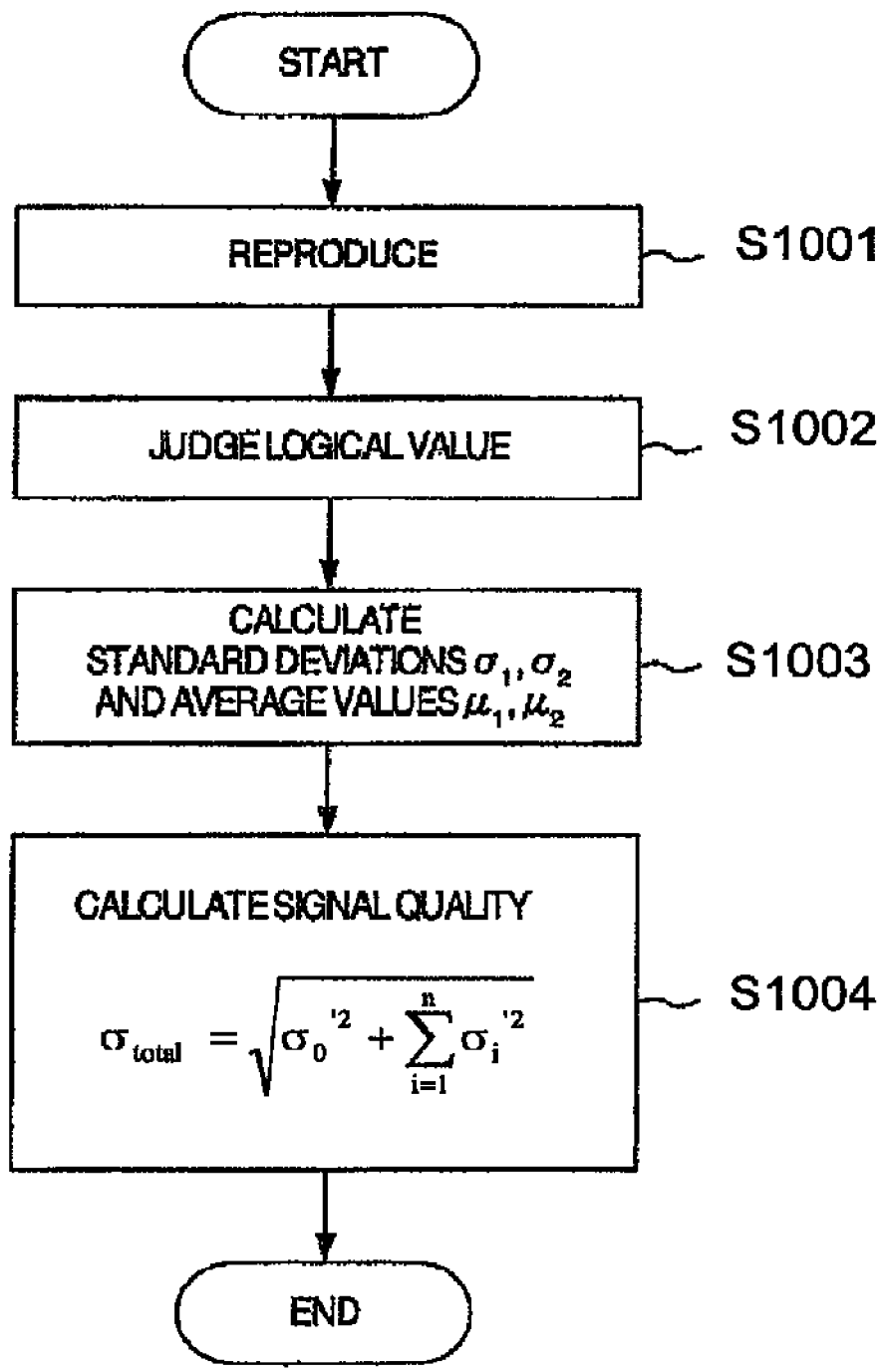

SIGNAL QUALITY EVALUATING APPARATUS AND METHOD, AND INFORMATION RECORDING MEDIUM

BACKGROUND OF THE INVENTION

The present invention relates to an apparatus for recording information in an optical information recording medium and/or reproducing information from an optical information recording medium, respectively by utilizing holography.

An optical disc having a record density of about 50 GB is now available even as a consumer product, using a blue-violet semiconductor laser and the Blu-ray Disc (BD) specifications. It is desired for the future that even an optical disk has a large capacity of 100 GB to 1 TB like a hard disc drive (HDD).

However, in order to realize such an ultra high density by an optical disk, high density techniques of a new type are required which are different from those of short wavelength and high NA objective lens.

While studies on next generation storage techniques are made, hologram recording techniques of recording digital information by utilizing holography have drawn attention. According to the hologram record techniques, signal light having information on page data two-dimensionally modulated with a spatial light modulator and reference light are superposed in a recording medium, and a generated interference pattern forms a refractive index modulation in the recording medium to record the information in the recording medium.

In reproducing information, as the reference light used for recording is applied to the recording medium, a hologram recorded in the recording medium operates like a diffraction grating to form diffraction light. This diffraction light is reproduced as the same light containing the recorded signal light and phase information.

The reproduced signal light is two-dimensionally detected at high speed with a photodetector such as a CMOS and a CCD. With the hologram recording techniques, two-dimensional information can be recorded in a recording medium at a time by one hologram, and the recorded information can be reproduced. Since a plurality of page data sets can be written in a stacked manner in an area of the recording medium, a large amount of information can be recorded/reproduced at high speed.

When an apparatus or an information recording medium utilizing such hologram recording techniques is manufactured, it is necessary to use signal quality evaluating means in order to judge whether a recording performance or reproducing performance of the apparatus or the performance of the information recording medium is sufficient or not.

As indices to be used by a signal quality evaluation method, there are an SNR (Signal to Noise Ratio) and a BER (Bit Error Rate).

The definition described in "System and Material for Holographic Memory" under supervision of Tsutomu SHIMURA is generally applied to SNR of hologram recording techniques. SNR is represented by:

$$SNR = \frac{\mu_{on} - \mu_{off}}{\sqrt{\sigma_{on}^2 + \sigma_{off}^2}}$$

where $\sigma_{on}$ and $\sigma_{off}$, and $\mu_{on}$ and $\mu_{off}$ are standard deviations and average values, respectively of the luminance value distribution of on-pixels and off-pixels of reproduced page data.

BER is an evaluation index representative of a ratio of a bit error of a reproduced signal to recorded data. A method of calculating BER from on-pixels and off-pixels is described, for example, in JP-A-2008-97688.

SUMMARY OF THE INVENTION

When an apparatus or a medium utilizing such hologram recording techniques is manufactured, it is necessary to use signal quality evaluation indices and margin design utilizing the evaluation indices in order to synthetically judge the performance of the apparatus or medium. In order to perform the margin design, it becomes necessary that the signal quality when a plurality of disturbances are applied to a system at the same time can be calculated by utilizing the signal quality when each disturbance is applied individually. This is because if a number of disturbance types are to be considered, the number of measurement combinations becomes enormous, and measuring all the combinations is not realistic.

For a presently used optical disc drive such as BD, a jitter is used as a signal quality evaluation index, and a root sum square is used for the margin design. A jitter is an index defined for an error of a signal along a time direction. Signals are collectively stored in a hologram memory as two-dimensional data so that the evaluation index cannot be defined in a similar manner.

If conventional signal quality evaluation indices SNR and BER are used, there arises an issue that although it is possible to evaluate a signal quality when a single disturbance is applied, a signal quality when composite disturbances are applied to a system at the same time is difficult to estimate from a signal quality when a disturbance is applied individually, because evaluation indices have no additivity.

It is therefore an object of the present invention to provide a signal quality evaluating method necessary for signal quality evaluation indices and margin design for an apparatus utilizing hologram recording techniques.

An object of the present invention is achieved, for example, by using as an evaluation index a value obtained by dividing a root sum square of standard deviations by a difference between average values.

According to the present invention, it is possible to provide a signal quality estimating apparatus, a signal quality estimating method and an information recording medium capable of evaluating a signal quality of data recorded by hologram recording techniques and calculating a signal quality when composite disturbances are applied at the same time from signal quality measurement results when respective disturbances are applied individually.

BRIEF DESCRIPTION OF THE DRAWINGS

FIG. 7 is a schematic circuit diagram of a second embodiment of a signal quality evaluation index calculating circuit of the embodiment.

FIG. 8 is a schematic diagram illustrating a second embodiment of an operation flow of calculating a signal quality evaluation index.

FIG. 10 is a schematic diagram illustrating a third embodiment of an operation flow of calculating a signal quality evaluation index.

DESCRIPTION OF THE EMBODIMENTS

Embodiments of the present invention will now be described.

Figure 1:
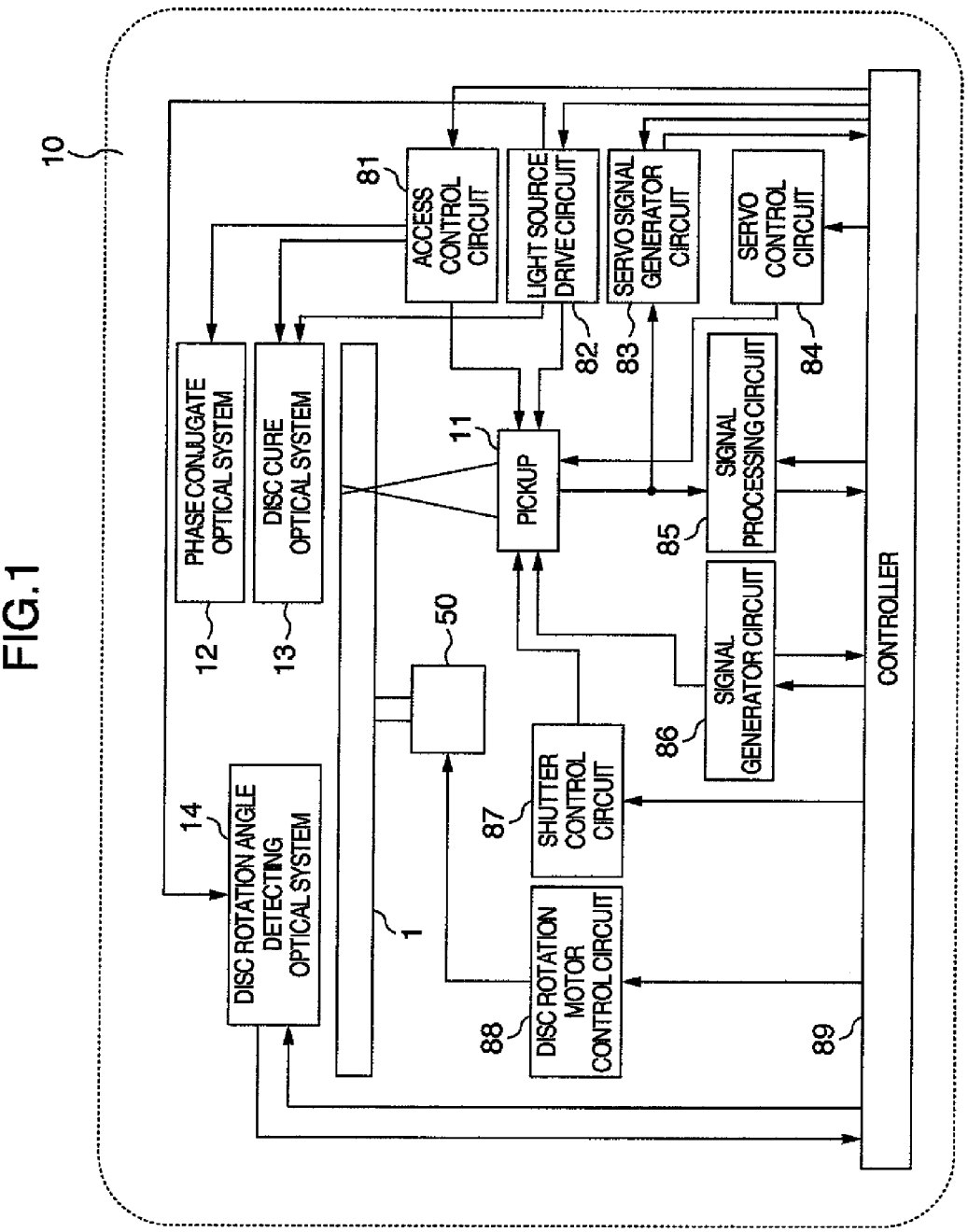
FIG. 1 is a schematic diagram illustrating an optical information recording/reproducing apparatus according to an embodiment.

Embodiments of the present invention will be described in connection with the accompanying drawings. FIG. 1 is a block diagram of a recording/reproducing apparatus for recording and/or reproducing digital information in/from an optical information recording medium by utilizing holography.

The optical information recording/reproducing apparatus 10 is provided with a pickup 11, a phase conjugate optical system 12, a disc cure optical system 13, a disc rotation angle detecting optical system 14 and a motor 50. An optical information recording medium 1 is rotated by the motor 50.

The pickup 11 fulfils a role of emitting reference light and signal light to the optical information recording medium 1 and recording digital information in the recording medium by utilizing holography. In this case, under control of a controller 89, an information signal to be recorded is sent via a signal generator circuit 86 to a spatial light modulator in the pickup 11 to modulate the signal light.

In reproducing information recorded in the optical information recording medium 1, the phase conjugate optical system 12 generates phase conjugate light of reference light emitted from the pickup 11. The phase conjugate light is the light propagating in a direction opposite to that of input light, while maintaining the same wave front. A photodetector to be described later in the pickup 11 detects light reproduced by the phase conjugate light, and a signal processing circuit 85 reproduces the signal.

A time period while the reference light and signal light are applied to the optical information recording medium 1 can be adjusted by making the controller 89 control an open/close time of a shutter in the pickup 11 via a shutter control circuit 87.

The disc cure optical system 13 fulfils a role of generating a light beam to be used for pre-cure and post-cure of the optical information recording medium 1. Pre-cure is a pre-process of irradiating a predetermined light beam before reference light and signal light are applied to a predetermined position of the optical information recording medium 1 to write information at the predetermined position. Post-cure is a post-process of irradiating a predetermined light beam to a desired position in order not to allow rewriting after information was recorded at the desired position of the optical information recording medium 1.

The disc rotation angle detecting optical system 14 is used for detecting a rotation angle of the optical information recording medium 1. In adjusting the optical disc recording medium 1 to have a predetermined rotation angle, the disc rotation angle detecting optical system 14 detects a signal corresponding to a rotation angle, and by using the detected signal, the controller 89 can control a rotation angle of the optical information recording medium 1 via a disc rotation control circuit 88.

A light source drive circuit 82 supplies a predetermined light source drive current to the pickup 11 and light sources in the disc cure optical system 13 and disc rotation angle detecting optical system 14 so that each light source can emit a light beam having a predetermined light amount.

The pickup 11 and disc cure optical system 13 each have a mechanism for sliding the position of the optical information recording medium 1 in a radial direction to control the position via an access control circuit 81.

Recording techniques utilizing holography can record ultra high density information. Therefore, for example, there is the tendency that an allowable margin of an inclination and a position displacement of the optical information recording medium 1 becomes very small.

Therefore, a mechanism for detecting a shift amount having a small allowable margin such as an inclination and a position displacement of the optical information recording medium 1 may be built in the pickup 11, a servo signal generator circuit 83 generates a servo control signal, and a servo mechanism for compensating for the shift via a servo control circuit 84 may be built in the optical information recording/reproducing apparatus 10.

The pickup 11, disc cure optical system 13 and disc rotation angle detecting optical system 14 may be constituted of several optical systems, or all optical systems may be a single optical system to simplify the structure.

Figure 2:
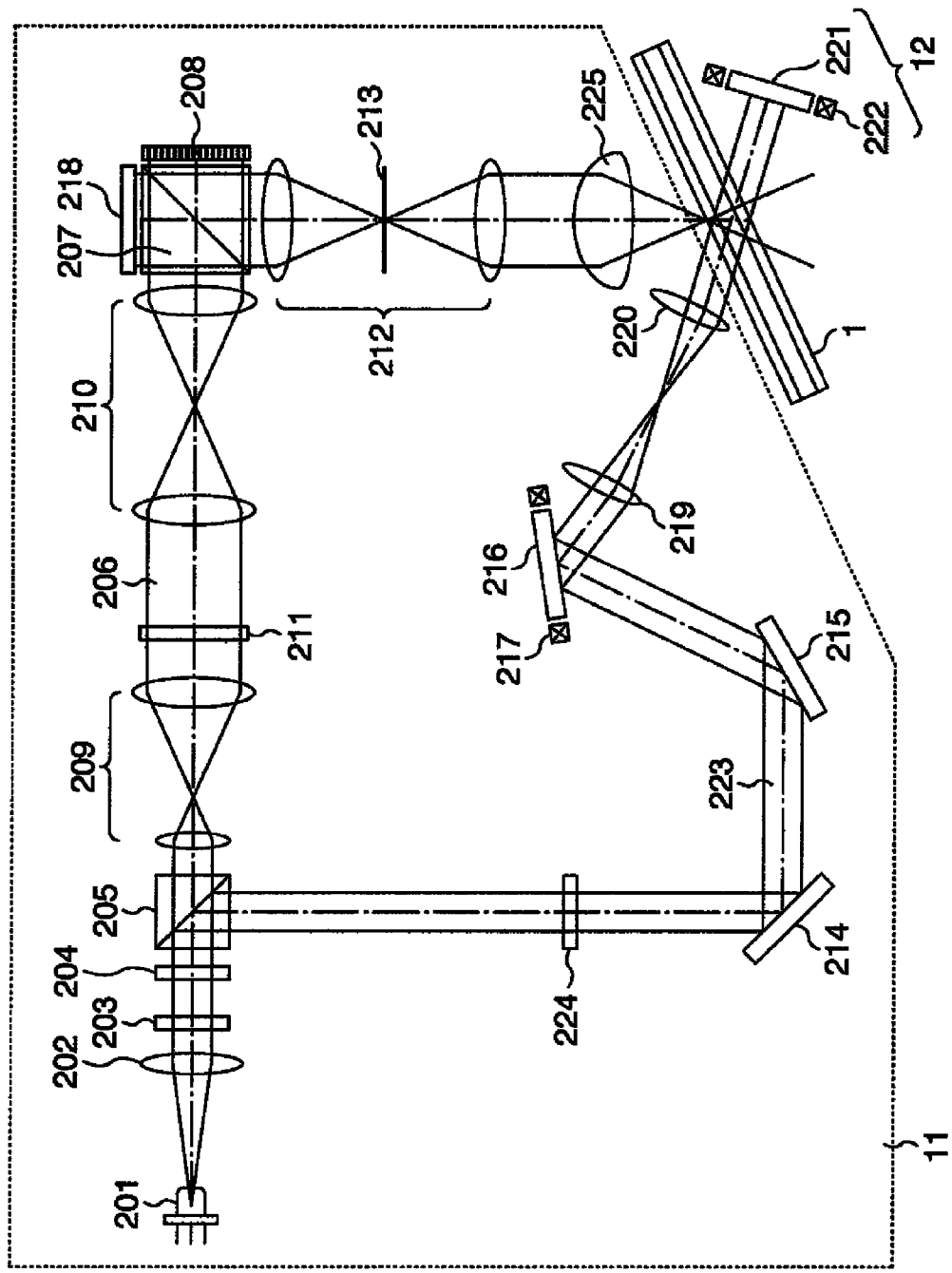
FIG. 2 is a schematic diagram illustrating a pickup of the optical information recording/reproducing apparatus of the embodiment.

FIG. 2 illustrates an example of the optical system structure of the pickup 11 of the optical information recording/reproducing apparatus 10. A light beam emitted from a light source 201 transmits through a collimate lens 202 and enters a shutter 203. While the shutter 203 opens, the light beam passes through the shutter 203, an optical element 204 constituted of, e.g., a half wavelength plate controls a polarization direction to make P polarized light and S polarized light have a desired light amount ratio, and thereafter the light beam enters a polarization beam splitter (PBS) prism 205.

A diameter of the light beam transmitted through the PBS prism 205 is made larger by a beam expander 209, and the light beam transmits through a phase mask 211, a relay lens 210 and a PBS prism 207 and enters a spatial light modulator 208.

A signal light beam added with information by the spatial light modulator 208 reflects at the PBS prism 207, and propagates through a relay lens 212 and a spatial filter 213. Thereafter, the signal light beam is converged upon the optical information recording medium 1 by an objective lens 225.

On the other hand, a light beam reflected at the PBS prism 205 functions as a reference light beam, is set with a predetermined polarization direction for recording or reproducing by a polarization conversion element 224, and enters a galvano mirror 216 via mirrors 214 and 215. Since an angle of the galvano mirror 216 can be adjusted by an actuator 217, an incidence angle of the reference light beam incident upon the information recording medium 1 after the light beam transmitted through lenses 219 and 220 can be set to a desired angle.

The signal light beam and reference light beam are applied being stacked mutually in the optical information recording medium 1 to form an interference pattern in the recording medium. By writing this pattern in the recording medium, information can be recorded. Further, angle multiplexing recording is possible because the galvano mirror 216 can change an incidence angle of the reference light beam incident upon the optical information recording medium 1.

In reproducing recorded information, the reference light beam is applied to the optical information recording medium 1 in the manner described above, and the light beam transmitted through the optical information recording medium 1 is reflected at a galvano mirror 221 to generate phase conjugate light of the reference light.

A light beam reproduced by the phase conjugate light propagates through the objective lens 225, relay lenses 212 and spatial filter 213. Thereafter, the reproduced light beam transmits through the PBS prism 207 and enters a photodetector 218 so that the recorded signal can be reproduced.

Figure 3:
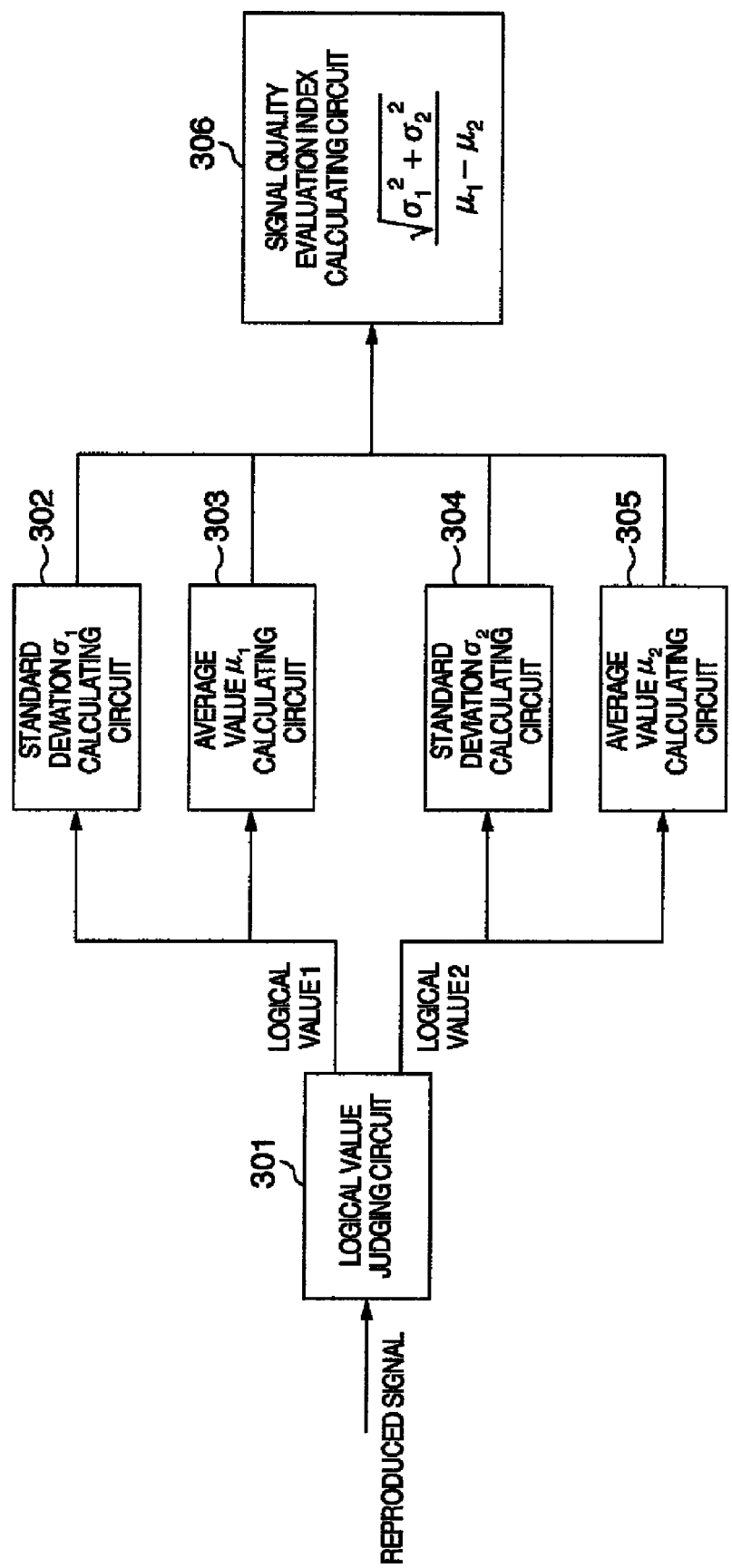
FIG. 3 is a schematic circuit diagram of a first embodiment of a signal quality evaluation index calculating circuit of the embodiment.
Figure 4:
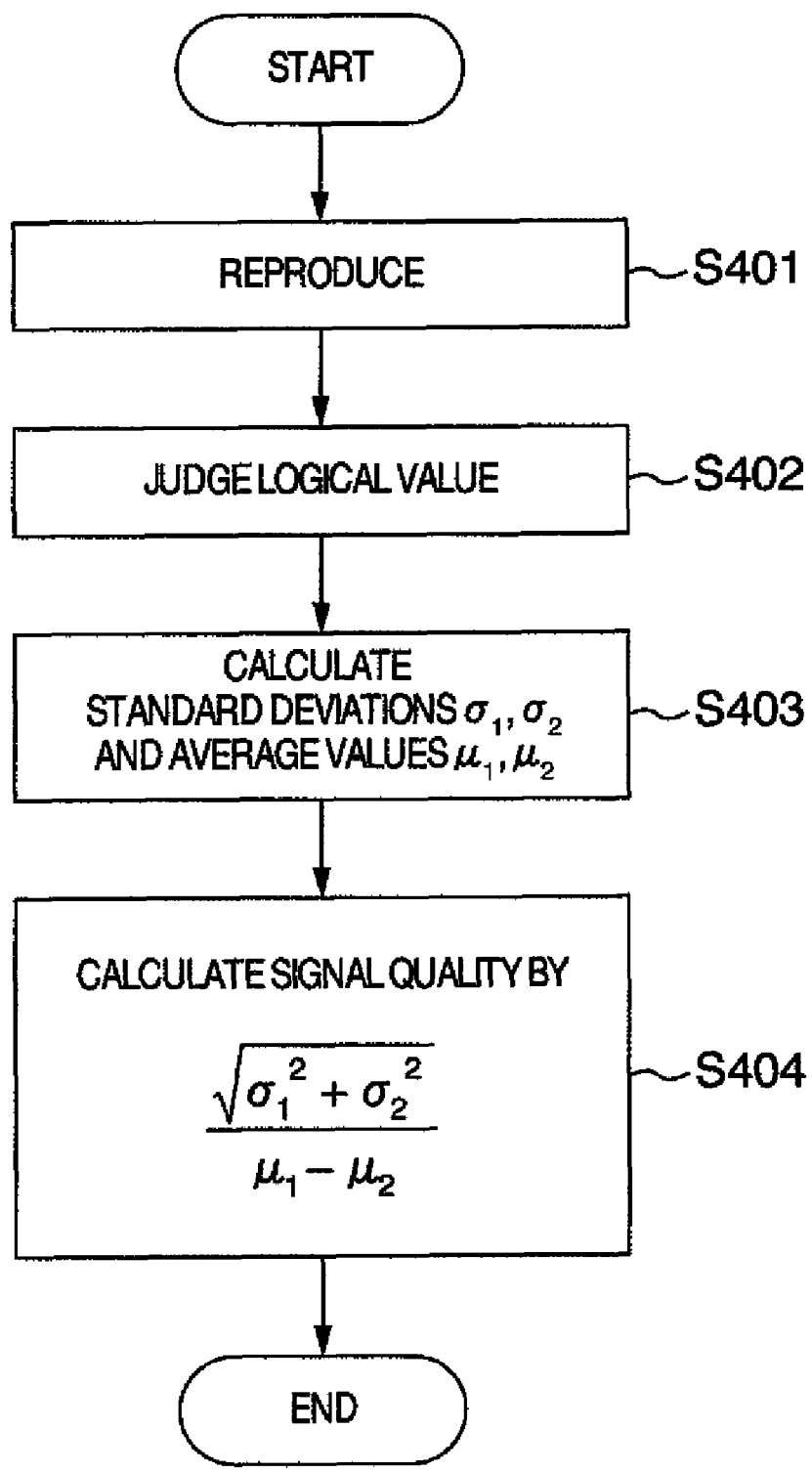
FIG. 4 is a schematic diagram illustrating a first embodiment of an operation flow of calculating a signal quality evaluation index.

FIG. 3 illustrates an example of the structure of a circuit for calculating a signal quality evaluation index, and this circuit may be realized in the signal processing circuit 85 of the optical information recording/reproducing apparatus 10. FIG. 4 is a flow chart illustrating a signal quality evaluation operation. With reference to FIGS. 3 and 4, description will be made on the operation of the signal quality evaluation index calculating circuit.

At Step S401 a hologram is reproduced, and the photodetector 218 in the pickup 11 detects a reproduced signal of two-dimensional data.

At Step S402 the reproduced signal is input to a logical value judging circuit 301 which sequentially judges an on-pixel as a first logical value and an off-pixel as a second logical value, in the page data.

At Step S403 standard deviations and average values corresponding to the first and second logical values are calculated. Namely, signals judged as the first logical value are input to a standard deviation calculating circuit 302 and an average value calculating circuit 303 which calculate a standard deviation $\sigma_1$ of luminance values and an average value $\mu_1$ of the luminance values. Whereas signals judged as the second logical value are input to a standard deviation calculating circuit 304 and an average value calculating circuit 305 which calculate a standard deviation $\sigma_2$ of luminance values and an average value $\mu_2$ of the luminance values.

At Step S404, a signal quality evaluation index is calculated. Namely, a signal quality evaluation index calculating circuit 306 calculates the values calculated by the calculating circuits 302 to 305 to evaluate a signal quality, by using the following equation (1):

$$\sigma' = \frac{\sqrt{\sigma_1^2 + \sigma_2^2}}{\mu_1 - \mu_2} \quad (1)$$

A signal quality can be evaluated also by using the following equation (2) replacing the numerator of the equation (1) of root sum square of standard deviations with sum of standard deviations, as shown for example in FIG. 8 at step S804, and in the signal quality evaluation index calculating circuit 706 of FIG. 7:

$$\sigma' = \frac{\sigma_1 + \sigma_2}{\mu_1 - \mu_2} \quad (2)$$

As compared to the equation (1), the equation (2) omits calculations of square sum and root so that although precision is insufficient, a circuit scale and cost can be reduced effectively.

Next, description will be made on why the equation (1) can evaluate a signal quality.

Figure 5:
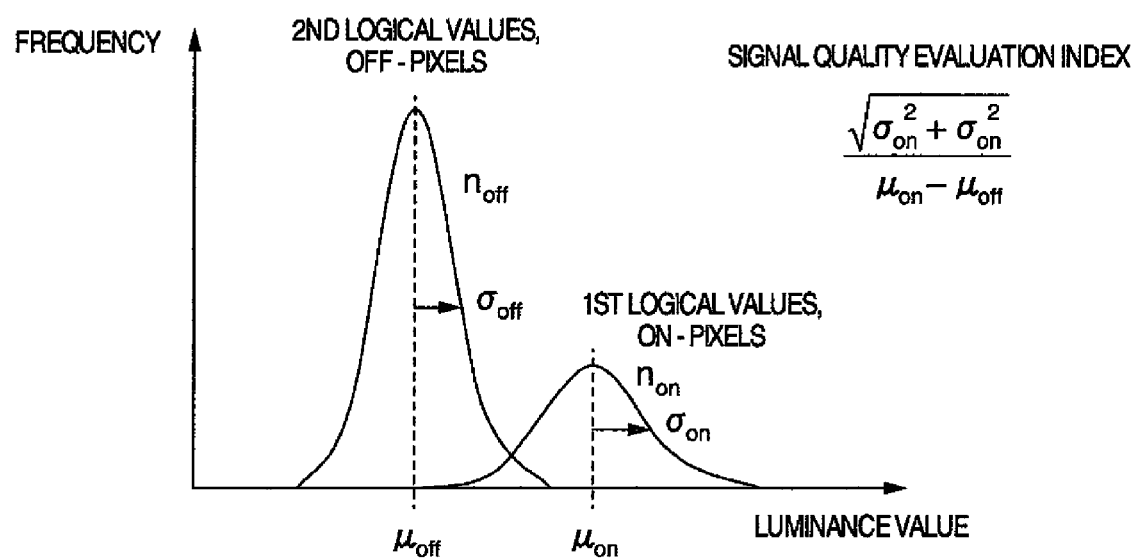
FIG. 5 is a schematic diagram illustrating a definition of a noise amount.

FIG. 5 illustrates an example of distribution of luminance information of reproduced signals of two-dimensional page data detected with the photodetector 318 of the optical information recording/reproducing apparatus 10. Data recorded even by binary values of the first logical value "on" and the second logical value "off" is influenced by disc noises and amplifier noises of the photodetector. Distribution of luminance information of the on-pixels and off-pixels over the whole page data has variation as illustrated in FIG. 5.

By representing the number of on-pixels by $n_{on}$, representing the number of off-pixels by $n_{off}$, representing a luminance of an i-th on-pixel in two-dimensional data by $x_{on-i}$ (i=1, 2, ..., $n_{on}$), representing a luminance of an i-th off-pixel by $x_{off-i}$ (i=1, 2, ..., $n_{off}$), representing a standard deviation of on-pixels by $\sigma_{on}$, representing a standard deviation of off-pixels by $\sigma_{off}$, representing an average value of on-pixels by $\mu_{on}$, and by representing an average value of off-pixels by $\mu_{off}$, standard deviations $\sigma_{on}$ and $\sigma_{off}$ calculated by the standard deviation calculating circuits 302 and 304 are expressed by the following equations (3) and (4):

$$\sigma_{on} = \sqrt{\frac{1}{n_{on}} \sum_{i=1}^{n_{on}} (x_{on-i} - \mu_{on})^2} \quad (3)$$

$$\sigma_{off} = \sqrt{\frac{1}{n_{off}} \sum_{i=1}^{n_{off}} (x_{off-i} - \mu_{off})^2} \quad (4)$$

Since the standard deviation is an RMS value of luminance values, it can be considered that the standard deviation is a noise amount.

Since a signal amplitude changes with disturbance, the equations (3) and (4) representative of the noise amounts are normalized by a signal amplitude, i.e., $\mu_{on} - \mu_{off}$ as in the following equations (5) and (6):

$$\sigma'_{on} = \frac{\sigma_{on}}{\mu_{on} - \mu_{off}} \quad (5)$$

$$\sigma'_{off} = \frac{\sigma_{off}}{\mu_{on} - \mu_{off}} \quad (6)$$

Although the signal qualities of on-pixels and off-pixels can be evaluated from the equations (5) and (6), respectively, the expressions of the signal qualities of on-pixels and off-pixels are provided separately and are inconvenient. Since the equations (3) and (4) give RMS values, a noise amount is defined by addition of root sum square as in the following equation (7). In this specification, a noise amount $\sigma'$ represented by the equation (7) is called a normalized noise.

$$\sigma' = \frac{\sqrt{\sigma_{on}^2 + \sigma_{off}^2}}{\mu_{on} - \mu_{off}} \quad (7)$$

The equation (7) is equivalent to the equation (1) whose index "1" is replaced with an index "on" and whose index "2" is replaced with an index "off". The reason why the equation (1) can evaluate the signal quality has been described above.

The standard deviation calculating circuits 302 and 304 can also evaluate the signal quality even if the equations (3) and (4) are replaced with the equations substantially regarded as standard deviations such as the following equations (8) and (9):

$$\sigma_{on} = \frac{1}{n_{on}} \sum_{i=1}^{n_{on}} |x_{on-i} - \mu_{on}| \quad (8)$$

$$\sigma_{off} = \frac{1}{n_{off}} \sum_{i=1}^{n_{off}} |x_{off-i} - \mu_{off}| \quad (9)$$

As compared to the equations (3) and (4), the equations (8) and (9) omit calculations of square sum and root so that although precision is insufficient, a circuit scale and cost can be reduced effectively.

In the above description, although information on all pixels in two-dimensional page data is used to calculate the normalized noise, the normalized noise may be calculated by using a portion of pixel information in the page.

Figure 9:
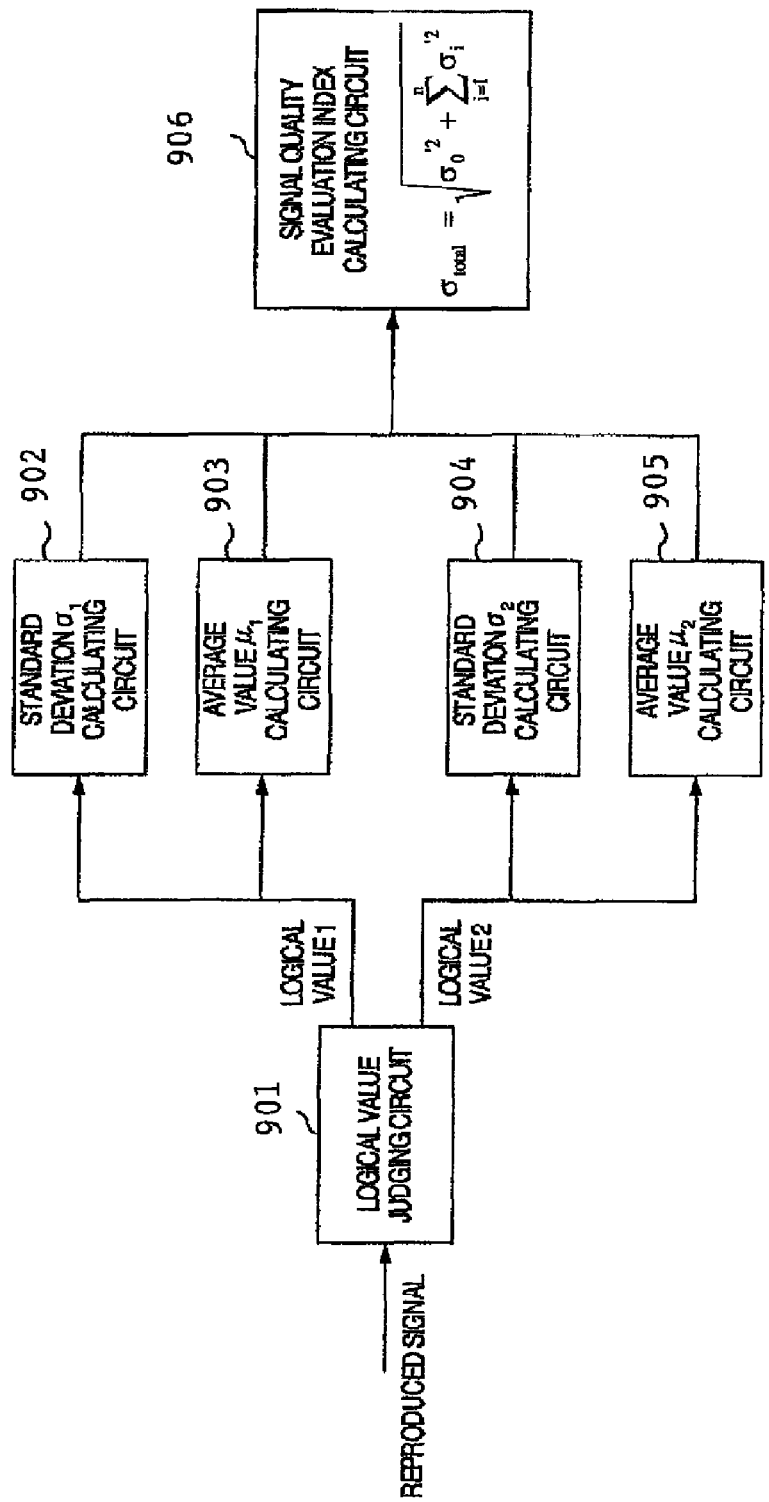
FIG. 9 is a schematic circuit diagram of a third embodiment of a signal quality evaluation index calculating circuit of the embodiment.

In order to make margin design, it is necessary to evaluate signal quality deterioration when a plurality of disturbances are applied compositely. The number of all disturbance combinations is enormous and measurements of all combinations are not realistic. Description will be made therefore on a method of calculating a normalized noise when a plurality of disturbances are applied compositely, from individual measurement results of disturbances. An example embodiment of evaluating signal quality deterioration when a plurality of disturbances are applied compositely is represented by FIG. 10 at step S1004 ("Calculate Signal Quality"), and in the signal quality evaluation index calculating circuit 906 of FIG. 9.

Even if the system is in the state that an optimum SNR is obtained because of no disturbance, there are signal quality deterioration factors in an optical system, an electric system, a disc and the like so that the normalized noise $\sigma'$ will not become 0. A signal quality under such predetermined conditions is called a fixed noise and represented by $\sigma_0'$. The normalized noise caused by each disturbance $x_i$ ($i=1, 2, \ldots, n$) is represented by $\sigma_i(x_i)'$ ($i=1, 2, \ldots, n$). It is considered that the normalized noise when a plurality of disturbances are applied compositely can be obtained through addition of root sum square, and is represented by the following equation (10):

$$\sigma(x_1, x_2, \ldots, x_n)' = \sqrt{\sigma_0'^2 + \sum_{i=1}^{n} \sigma_i(x_i)'^2} \quad (10)$$

If measurement is made by applying one disturbance $x_j$, it is assumed that other disturbances $x_i$ ($i \neq j$) are 0. In this case, since $\sigma_i(x_i)'=0$ ($i \neq j$), the equation (10) is rewritten as in the following:

$$\sigma(x_1, x_2, \ldots, x_n)' = \sqrt{\sigma_0'^2 + \sigma_j(x_j)'^2} \quad (11)$$

Signal quality deterioration caused by the disturbance $x_j$ is expressed by the following equation (12):

$$\sigma_j(x_j)' = \sqrt{\sigma(x_1, x_2, \ldots, x_n)'^2 - \sigma_0'^2} \quad (12)$$

The equation (12) indicates that even measurement of the normalized noise containing the fixed noise can calculate the pure normalized noise for each disturbance.

In actual margin design, the normalized noise for each disturbance is measured and calculated by the equation (12), and the normalized noise when disturbances are applied at the same time is calculated by the equation (10). If the normalized noise when disturbances are applied at the same time is allowed by the system, the error amount $x_j$ for each disturbance can be estimated as an allowable margin.

Figure 6A:
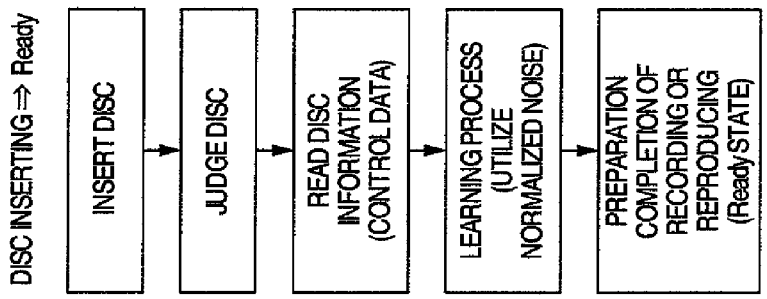
FIGS. 6A to 6C are schematic diagrams illustrating an operation flow of an optical information recording/reproducing apparatus.
Figure 6B:
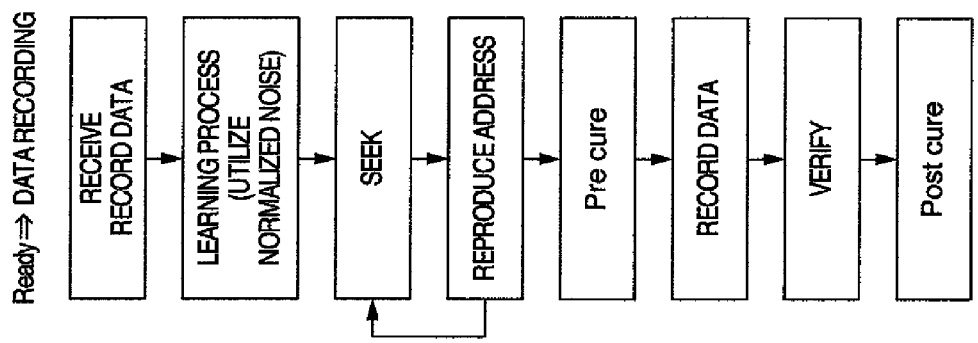
Figure 6C:
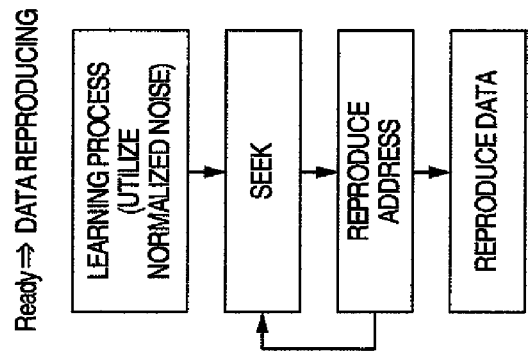

FIGS. 6A to 6C illustrate an operation flow of recording/reproducing of the optical information recording/reproducing apparatus 10. FIG. 6A illustrates an operation flow of inserting the optical information recording medium 1 in the optical information recording/reproducing apparatus 10 and completing preparation for recording or reproducing. FIG. 6B illustrates an operation flow from a preparation completion state to information recording in the optical information recording medium 1. FIG. 6C illustrates an operation flow from a preparation completion state to information reproducing from the optical information recording medium 1.

As illustrated in FIG. 6A, as a medium is inserted, the optical information recording/reproducing apparatus 10 judges, for example, whether the inserted medium is used for recording/reproducing digital information by utilizing holography.

If a disc judgment result indicates that the medium is an optical information recording medium for recording/reproducing digital information by utilizing holography, the optical information recording/reproducing apparatus 10 reads control data provided in the optical information recording medium to acquire, for example, information on the optical information recording medium, and information on various setting conditions for recording/reproducing. After the control data is read, the optical information recording/reproducing apparatus 10 makes various adjustments corresponding to the control data, and executes a learning process for the pickup 11, to complete preparation for recording or reproducing. In the learning process, various adjustments may be made by using the normalized noise as the evaluation index. Alternatively, information on the normalized noise may be recorded beforehand in the control data, and the read normalized noise may be used as an adjustment target value.

In the operation flow from the preparation completion state to recording, as illustrated in FIG. 6B, data to be recorded is first received, and then information corresponding to the data is supplied to the spatial light modulator in the pickup 11.

Thereafter, in order to record information of high quality in the optical information recording medium, various learning processes are executed in advance when necessary. In this case, optimum recording conditions may be obtained by recording a plurality of holograms by changing recording conditions, performing reproducing under optimum reproducing conditions, and measuring the normalized noise of each hologram under each recording condition. Thereafter, a seek operation and address reproducing are repeated to place the pickup 11 and disc cure optical system 13 at predetermined positions of the optical information recording medium.

Thereafter, a predetermined area is pre-cured by using a light beam emitted from the disc cure optical system 13, and data is recorded by using reference light and signal light emitted from the pickup 11. After data is recorded, the data is verified if necessary, and post-cure is performed by using a light beam emitted from the disc cure optical system 13.

In the operation flow from the preparation completion state to reproducing recorded information, as illustrated in FIG. 6C, in order to reproduce information of high quality from the optical information recording medium, various learning processes are executed in advance when necessary. In this case, optimum reproducing conditions may be obtained by reproducing each hologram by changing reproducing conditions, and by measuring the normalized noise under each reproducing condition. Thereafter, a seek operation and address reproducing are repeated to place the pickup 11 at a predetermined position of the optical information recording medium. Thereafter, reproducing light is emitted from the pickup 11 to read information recorded in the optical information recording medium.

As described so far, according to the signal quality evaluating apparatus of the present invention, a value obtained by dividing root sum square of standard deviations of luminance distributions of on- and off-pixels obtained from reproduced signals, by a difference between average values is used as an evaluation index. It is therefore possible to evaluate a signal quality of a hologram and calculate a signal quality when composite disturbances are applied at the same time, from a signal quality measurement result when each disturbance is applied.

Although hologram recording techniques utilizing an angle multiplexing method have been described mainly, the advantages of the present invention can be obtained also by different hologram recording techniques processing two-dimensional page data such as a coaxial method of disposing signal light and reference light coaxially. The present invention is not limited to hologram recording techniques, but is applicable to another reproducing method processing QR code if two-dimensional data is used.

Although the recording/reproducing apparatus has been described mainly, the present invention is also applicable to a reproducing apparatus to adjust reproducing conditions.

The invention claimed is:

1. A signal quality evaluating apparatus comprising:
   a judging means for judging a first reproduced signal corresponding to a first logical value and a second reproduced signal corresponding to a second logical value from a reproduced signal containing information corresponding to said first logical value and said second logical value;
   a calculating means for calculating a standard deviation $\sigma_1$ of distribution of luminance values of said first reproduced signals and a standard deviation $\theta_2$ of distribution of luminance values of said second reproduced signals;
   a calculating means for calculating an average value $\mu_1$ of the distribution of luminance values of said first reproduced signals and calculating an average value $\mu_2$ of the distribution of luminance values of said second reproduced signals; and
   a calculating means for calculating a signal quality $\sigma'$ of said reproduced signal by:

$$\sigma' = \frac{\sqrt{\sigma_1^2 + \sigma_2^2}}{\mu_1 - \mu_2}.$$

2. The signal quality evaluating apparatus according to claim 1, further comprising:
   a calculating means for calculating a signal quality deterioration $\sigma_i'$ caused by a disturbance i by:

$$\sigma_i' = \sqrt{\sigma'^2 - \sigma_0'^2}$$

wherein $\sigma_0'$ is a signal quality under a predetermined condition evaluated by the signal quality evaluating apparatus according to claim 1, and $\sigma'$ is the signal quality when a disturbance i is applied under the predetermined condition.

3. The signal quality evaluating apparatus according to claim 2, further comprising:
   a calculating means for calculating said signal quality deterioration $\sigma_i'$ when only an i-th (i=1, 2, ..., n) disturbance among n disturbances is applied by using the signal quality evaluating apparatus according to claim 2, and calculating a signal quality $\sigma_{total}'$ when said n disturbances are applied compositely by:

$$\sigma_{total}' = \sqrt{\sigma_0'^2 + \sum_{i=1}^{n} \sigma_i'^2}.$$

4. A signal quality evaluating apparatus comprising:
   a judging means for judging a first reproduced signal corresponding to a first logical value and a second reproduced signal corresponding to a second logical value from a reproduced signal containing information corresponding to said first logical value and said second logical value;
   a calculating means for calculating a standard deviation $\sigma_1$ of distribution of luminance values of said first reproduced signals and a standard deviation $\sigma_2$ of distribution of luminance values of said second reproduced signals;
   a calculating means for calculating an average value $\mu_1$ of the distribution of luminance values of said first reproduced signals and calculating an average value $\mu_2$ of the distribution of luminance values of said second reproduced signals;
   a calculating means for calculating a signal quality $\sigma'$ of said reproduced signal by:

$$\sigma' = \frac{\sigma_1 + \sigma_2}{\mu_1 - \mu_2}; \text{ and}$$

a calculating means for calculating a signal quality deterioration $\sigma_i'$ caused by a disturbance i by:

$$\sigma_i' = \sqrt{\sigma'^2 - \sigma_0'^2}$$

wherein $\sigma_0'$ is a signal quality under a predetermined condition, and $\sigma'$ is the signal quality when a disturbance i is applied under the predetermined condition.

5. The signal quality evaluating apparatus according to claim 4, further comprising:
   a calculating means for calculating said signal quality deterioration $\sigma_i'$ when only an i-th (i=1, 2, ..., n) disturbance among n disturbances is applied by using the signal quality evaluating apparatus according to claim 4, and calculating a signal quality $\sigma_{total}'$ when said n disturbances are applied compositely by:

$$\sigma_{total}' = \sqrt{\sigma_0'^2 + \sum_{i=1}^{n} \sigma_i'^2}.$$

6. A signal quality evaluating method comprising steps of:
judging a first reproduced signal corresponding to a first logical value and a second reproduced signal corresponding to a second logical value from a reproduced signal containing information corresponding to said first logical value and said second logical value;
calculating a standard deviation $\sigma_1$ of distribution of luminance values of said first reproduced signals and a standard deviation $\sigma_2$ of distribution of luminance values of said second reproduced signals;
calculating an average value $\mu_1$ of the distribution of luminance values of said first reproduced signals and calculating an average value $\mu_2$ of the distribution of luminance values of said second reproduced signals; and
calculating a signal quality $\sigma'$ of said reproduced signal by:

$$\sigma' = \frac{\sqrt{\sigma_1^2 + \sigma_2^2}}{\mu_1 - \mu_2}.$$

7. The signal quality evaluating method according to claim 6, further comprising a step of:
calculating a signal quality deterioration $\sigma_i'$ caused by a disturbance i by:

$$\sigma_i' = \sqrt{\sigma'^2 - \sigma_0'^2}$$

wherein $\sigma_0'$ is a signal quality under a predetermined condition evaluated by the signal quality evaluating apparatus according to claim 6, and $\sigma'$ is the signal quality when a disturbance i is applied under the predetermined condition.

8. The signal quality evaluating method according to claim 7, further comprising a step of:
calculating said signal quality deterioration $\sigma_i'$ when only an i-th (i=1, 2, ..., n) disturbance among n disturbances is applied by using the signal quality evaluating apparatus according to claim 7, and calculating a signal quality $\sigma_{total}'$ when said n disturbances are applied compositely by:

$$\sigma_{total}' = \sqrt{\sigma_0'^2 + \sum_{i=1}^{n} \sigma_i'^2}.$$

9. A signal quality evaluating method comprising steps of:
judging a first reproduced signal corresponding to a first logical value and a second reproduced signal corresponding to a second logical value from a reproduced signal containing information corresponding to said first logical value and said second logical value;
calculating a standard deviation $\sigma_1$ of distribution of luminance values of said first reproduced signals and a standard deviation $\sigma_2$ of distribution of luminance values of said second reproduced signals;
calculating an average value $\mu_1$ of the distribution of luminance values of said first reproduced signals and calculating an average value $\mu_2$ of the distribution of luminance values of said second reproduced signals;
calculating a signal quality $\sigma'$ of said reproduced signal by:

$$\sigma' = \frac{\sigma_1 + \sigma_2}{\mu_1 - \mu_2}; \text{ and}$$

calculating a signal quality deterioration $\sigma_i'$ caused by a disturbance i by:

$$\sigma_i' = \sqrt{\sigma'^2 - \sigma_0'^2};$$

wherein $\sigma_0'$ is a signal quality under a predetermined condition, and $\sigma'$ is the signal quality when a disturbance i is applied under the predetermined condition.

10. The signal quality evaluating method according to claim 9, further comprising a step of:
calculating said signal quality deterioration $\sigma_i'$ when only an i-th (i=1, 2, ..., n) disturbance among n disturbances is applied, and calculating a signal quality $\sigma_{total}'$ when said n disturbances are applied compositely by:

$$\sigma_{total}' = \sqrt{\sigma_0'^2 + \sum_{i=1}^{n} \sigma_i'^2}.$$

* * * * *